Patented Feb. 29, 1944

2,342,823

UNITED STATES PATENT OFFICE 2,342,823

MATERIALS FROM HIGH MOLECULAR POLYAMIDES

Paul Schlack, Berlin-Treptow, Germany; vested in the Alien Property Custodian

No Drawing. Application October 4, 1940, Serial No. 359,811. In Germany October 7, 1939

6 Claims. (Cl. 260—78)

My instant invention relates to the improvement of formed materials from polymides of high molecular weight.

Linear polyamides, for instance, condensation products from $\omega\omega'$-diamines and $\omega\omega'$-dicarboxylic acids, from $\omega$-aminocarboxylic acids and derivatives thereof as esters and amides, polymerization products from lactams, and mixed condensates or mixtures from different condensation products including such as contain heteroatoms, for instance, oxygen, sulfur, and nitrogen or heterogroups as SO and $SO_2$ exhibit a hydrophilic property corresponding to the number of hydrophilic amide groups, the chemical structure of the components, and the orientation. This is clearly evidenced by an increase in length upon immersion in water. Although the absorption of water by weight generally is only relatively low, it changes the physical properties and the chemical reactivity. For instance, the stiffness of filament materials as bristles prepared from condensation products from hexamethylenediamine adipate or aminocaproic acid is rather quickly reduced in contact with water. Mixed polymerizates which possess relatively short chains, especially radicals of aminocarboxylic acids having a short chain such as e-aminocaproic acid and substituted aminocarboxylic acid are greatly affected by water. Mixed polymerizates of this kind generally are soluble in alcohols or aqueous alcohols and the degree of alkali-solubility of mixed condensates of the same type commonly varies parallel with the sensitiveness to water. Formed materials such as thread, bristles, and foils from mixed condensation products made from hexamethylenediamine adipate and aminocaproic acid and containing about 40-85 per cent of aminocaprolactam as a component are of inferior quality if treated with hot water. They shrink and lose their orientation if they had been previously drawn; often they are dissolved in boiling water wth formations of lumps.

Experiments have been made in order to remove this disadvantage by means of formaldehyde as it was supposed that the reactive radicals particularly the amino groups react with the aldehyde. By this process only an inconsiderable improvement has been obtained. An essential retardation of velocity in the absorption of water which suffices in many cases is also not attained, even if the basic end groups are free and not closed by alkyl groups.

My instant invention has as an object the provision of a process for improving the resistance to water of polyamide materials especially for retarding the velocity with which they will absorb water.

Another object of the invention is to provide a process of treating polyamide materials which, if desired, are already dyed at an appropriate pH-value with water-soluble anionic or cationic tanning agents which are of molecular solubility.

Further objects will be seen from the following detailed specification.

The tanning agents used in the new process are chosen corresponding with the electrochemical character of the polyamide which is to be improved. The polyamides having basic character are therefore treated with acid agents and the polyamides having acid character are reacted with basic agents, the acid substances being advantageously used in an acid medium and the basic substances in a basic or weakly acid medium. In using basic substances in an alkaline medium a sufficient molecular solubility at the appropriate pH-value is necessary.

The term "tanning-agent" as used herein refers to compounds which form hydrophobic precipitates of salt-like nature with soluble high molecular compounds of opposite electrochemical character, for instance basic substances as fat acid amines, high molecular quaternary ammonium salts, guanides, biguanides, and isothioureas or acid substances as carboxylic acids or sulfonic acids of high and middle molecular weight as substituted phthalic acids, fat acids, and alkylnaphthalenesulfonic acids. It is, however, necessary that as mentioned above the precipitating that is the tanning component is of at least partly molecular solubility in water. Colloid substances, for instance vegetable tanning substances as tannin are not or insufficiently effective.

A modification of my process consists in incorporating the tanning compound in the mass to be worked and indeed in such a form that the effect is not produced. For instance, it is possible to incorporate the salt of an amine with a high molecular weight into a polyamide having an acid character and to accomplish the reaction by after-treating the polyamide with the aqueous solution of a base. This process is especially used if the question is as to work up solutions of polyamides in organic solvents. The reaction can already be carried out directly after spinning, for instance in a precipitating bath. A modification especially applicable to the working up of solutions consists in mixing the material in its production with water-soluble substances capable of tanning and of anionic and cationic nature whereupon the reaction is carried through in an after-treatment. In using salts with volatile components, for instance acetic acid salts of high molecular amines or salts of high molecular acids with volatile bases the mixture can be after-treated only by heating. In other cases the conversion can be effected by changing the pH-value of the solution, by hydrolyzing agents or by specific compounds, for instance formaldehyde for ammonium or amine salts.

If it is desired that the materials are improved by subsequent drawing, it is advantageous to carry out the treatment above mentioned after drawing or to insert a repeated treatment after drawing in order that the new surface formed in drawing is again completely coated with the reactive substances.

Substances which are capable of tanning in accordance with my instant invention are numerous. Substances of anionic character, for instance, are as follows:

(1) *Sulfo acids and sulfo esters*

Dodecylsulfo acid, dodecylsulfuric acid, benzylsulfanilic acid, naphthalenesulfo acids, naphtholsulfo acids, benzylnaphthalenesulfo acid, anthracenesulfo acid, condensation products from β-naphthalenesulfo acid and formaldehyde, condensation products from phenols especially polycyclic phenols with formaldehyde and alkali metal bisulfite. Valuable compounds of the latter kind are the reaction products from dihydroxydiarylsulfones with formaldehyde and sodium bisulfite and mixtures of condensation products of this kind which contain sulfomethyl groups with more than one sulfo radical.

(2) *Carboxylic acids*

Alkylsalicylic acids, substituted, preferably halogenated phthalic acids, halogenated aliphatic carboxylic acids with more than 6 carbon atoms.

(3) *Polyacids*

Phosphotungstic acid, phosphomolybdic acid, silicotungstic acid, and polyphosphoric acids. The phosphoric acids, for instance hexametaphosphoric acid or mixture thereof with pyrophosphoric acid have a very good activity in the sense of my instant invention as well as the advantage of a very high stability in light.

Substances of cationic character, for instance, are as follows:

Lauryldimethylamine, dodecylguanidine, dodecylbiguanide, octadecylbiguanide, N-dodecyl-S-methylisothioureaether hydrochloride, dicyclohexylamine, perhydrocarbazole.

The quantitative effect of these compounds is dependent upon their molecular weights and the structural density of the material to be treated. Too high molecular substances are not able to penetrate into the inner parts of the filaments and foils and therefore only produce an effect on the surface. Too low molecular substances have, it is true, a good penetrating effect but only a mediocre total effect. In most cases mixtures of substances having a different molecular weight but an electrochemical character of the same kind are of especial advantage. The substances different in their molecular weights may be caused to react at the same time or in succession. In latter case it is advantageous with relatively low molecular compounds to detan the outer layer by means of alkaline agents or acids.

The working method has always to be carried through corresponding to the physical properties of the materials. In many cases it is appropriate to carry out the action with drawing or to finish it with drawing. The materials, for instance, can be saturated by the tanning agents at low temperature without drawing whereupon the temperature is raised to the desired maximum with drawing. Working with suitable drawing is especially advantageous in case the material is tanned in the presence of swelling agents such as thiocyanates, alcohols, formamide or phenols. Such swelling agents are to be used if a penetrating effect as intensive as possible shall be attained by certain relatively high molecular compounds.

If the reactants of anionic or cationic nature have multivalent characters, a very good effect is obtained by an after-treatment with a countercomponent capable of saturating the salt-forming hydrophil groups in excess and forming a hydrophobe salt. In using for instance polyacids or heteropolyacids the after-treatment may be carried out with bases as dicyclohexylamine, dodecylamine or dodecylbiguanide; in using multivalent bases, acids as lauric acid, chlorinated linseed oil fat acid, tetrachlorophthalic acid or alkylnaphthalenesulfo acid may serve as reactants. The acids if insufficiently soluble in water are advantageously used in form of their salts with volatile bases, the bases if necessary in form of their volatile acids as formic acid, acetic acid or carbonic acid.

If the tanning substances contain groups capable of reacting together with carbonyl compounds, for instance guanidine groups, biguanide groups or urea groups, a further improvement can be obtained by an after-treatment with formaldehyde, glyoxal, dihydroxyacetone, phenylglyoxal or similar compounds, advantageously with subsequent heating to above 100° C. A corresponding after-treatment with substances containing a metal which can be splitted off is appropriate, if complex-forming groups as in biguanides, alkylsalicylic acids, acid β-dicarbonyl compounds, for instance, sulfonated acetoacetamides are present.

An improvement in the sense of my invention is moreover obtained by precipitating metal hydroxides as chromic hydroxide in the filament. For this purpose the materials may be treated with chromic acid in the presence of a reducing agent as lactic acid or glucose. The chromic acid shall first be absorbed in non-reduced form. The reduction can also be carried through in a separate bath, for instance with bisulfite. Moreover, complex acids of trivalent chromium as "Reineke acid" can be absorbed by the materials; the hydrolysis and formation of chromic hydroxide can be obtained by increasing the temperature. The metal compounds may also be precipitated by alkylene oxides according to the process described in German specification No. 642,442, especially if the polyamides are not worked from the fused mass but from solutions. It is of advantage to after-treat the materials additionally with tanning agents adapted to their electrochemical characters. The deposit of chromic hydroxide also effects an improvement of the stability in light of the materials.

*Example I*

A mixed condensation product prepared from hexamethylene-diamine adipate and ε-caprolactam and containing 45 per cent of ε-caprolactam is dissolved in as much warm 95 per cent methanol as necessary to obtain a solution of 30 per cent strength. The solution is cast to form a film and the latter is treated in a liquor ratio of 1:200 with 1–5 per cent of sodium metaphosphate and 2–5 per cent of 85 per cent formic acid at 30–75° C. for half an hour. The film loses its sensitiveness to water owing to this action and also remains stable in boiling water. The effect can be improved by a treatment with formaldehyde after the application of metaphosphate. Moreover, an addition of sodium pyrophosphate to the bath advantageously at the end of the treatment is appropriate.

The process may also be modified in such a manner that the film is first treated with sodium pyrophosphate and then with metaphosphate, the phosphates being dissolved in formic acid. In this case it is advantageous for removing metaphosphoric acid absorbed in the outer surfaces to insert a short treatment with an alkaline agent.

Example II

An artificial fiber prepared from a mixed polymerizate made from hexamethylenediamine adipate and ε-caprolactam and containing 25 per cent of lactam in the presence of hydrochloric acid ($2/100$ mol per each atom of nitrogen in the reaction mixture) is treated after the drawing in a ratio of 1:4 with metaphosphoric acid as described in Example 1. The fiber is finally after-treated at 70° C. with a solution containing 1 per cent of dodecylamine acetate and 1 per cent of octadecylamine acetate. The resistance to water of the fiber has been improved.

Example III

A mixed condensate derived from tetramethylenediamine adipate and ε-caprolactam with an addition of acetic acid ($1/150$ mol per each atom of nitrogen) is spun from melt. After the filaments thus formed have been drawn they are first treated with a 1 per cent acetic acid solution of N-butyltriaminotriazine at a temperature increasing from 30–50° C. for half an hour and subsequently with a 1 per cent formaldehyde solution at 50° C. When dried the filament is heated with stretching at 120° C. for ten minutes. The resistance to water has been improved.

Example IV

A condensation product from hexamethylenediamine adipate and ε-caprolactam and containing 30 per cent of lactam in the presence of free hexamethylenediamine ($1/400$ mol per each atom of nitrogen) is worked up into filaments according to the melting spinning process. After drawing the filaments are curled by hot water. The filaments are then treated with 3 per cent of potassium bichromate and 4 per cent of formic acid at 40–70° C. whereupon the bichromate which is on the filament is reduced by an addition of reducing agents as, for instance, lactic acid or by an after-treatment with a bisulfite solution. After drying without drawing and after subsequent heating at 110–120° C. the resistance to water has been clearly increased. A still better effect is obtained by a treatment with phosphotungstic acid or more advantageously with metaphosphoric acid carried out after the reduction.

Example V 20 parts of ε-caprolactam and 80 parts of hexamethylenediamine adipate are condensed in the presence of octadecylamine ($1/200$ mol per each nitrogen atom) in known manner. From the fused mass bristles are made by spinning. The bristles which possess a thickness of 0.25 mm. after the directly subsequent drawing are after-treated with a solution which contains 1 per cent of sodium pyrophosphate, 2 per cent of sodium metaphosphate, and 3 per cent of formic acid referred to the fiber material at 50° C. for 2 hours and are finally boiled in water under tension for 2 hours. The bristles thus prepared are of a better quality.

Example VI

Bristles which are prepared from polymeric ε-caprolactam made as described in Belgian Patent 434,794 in the presence of $1/200$ mol of hydrochloric acid and still contain 7–8 per cent of monomeric lactam from the spinning process are moistened with water (1:4), drawn and treated with a solution heated to 50° C. and containing 1 per cent of sodium metaphosphate, 3 per cent of sodium acetate, and 2 per cent of formic acid on a frame with stress. After half an hour the temperature is gradually raised to the boiling point. The boiling is continued for one hour. Finally the bristles are watered in the cold for 48 hours.

Example VII

A foil from the mixed polymerizate made from 60 parts of ε-caprolactam is treated with 2 per cent of the reaction product of 4.4'-dihydroxydiphenylsulfone, formaldehyde and sodium bisulfite at 20° C. for 15 minutes whereupon the temperature is cause to raise gradually to 60° C. during 15 minutes. The resistance to water of the foil has been essentially improved by this procedure.

The foil may also consist of a mixture of different condensation stages. In this case it is advantageous that the quantity of the sulfo-compound having one sulfone radical in the molecule is predominating.

Example VIII

The mixed polymerizate prepared from 60 parts of hexamethylenediamine adipate and 40 parts of ε-caprolactam with an addition of adipic acid ($1/100$ mol per each nitrogen atom) is dissolved in hot 92 per cent alcohol whereupon 1.5 per cent of oleylamine acetate are added to and the whole is cast to form foils.

By after-treating the foils with water containing ammonia the resistance to water is improved. If instead of the ammoniacal water an aqueous solution which contains besides ammonia fiber-affin acids as, for instance, chlorinated phthalic acid, benzylsulfanilic acid or butylnaphthalenesulfenic acid is used, a still better resistance to water is attained.

What I claim is:

1. The process of improving the water-resistance of a water-sensitive reaction product of a linear polymer-forming composition composed in substantial amount of reacting materials selected from at least one of the group consisting of (1) monoaminomonocarboxylic acids and (2) mixtures of diamine with dibasic carboxylic acid which comprises reacting said reaction product with a water-soluble poly-phosphoric acid of opposite electrochemical charge and which will react therewith to form a hydrophobic precipitate.

2. The process of improving the water-resistance of a water-sensitive reaction product of a linear polymer-forming composition composed in substantial amount of reacting materials selected from at least one of the group consisting of (1)

monoaminomonocarboxylic acids and (2) mixtures of diamine with dibasic carboxylic acid which comprises reacting said reaction product, in the presence of a swelling agent for the latter, with a water-soluble polyphosphoric acid of opposite electrochemical charge and which will react with said reaction product to form a hydrophobic precipitate.

3. The process of improving the water-resistance of a water-sensitive reaction product of a linear polymer-forming composition composed in substantial amount of reacting materials selected from at least one of the group consisting of (1) monoaminomonocarboxylic acids and (2) mixtures of diamine with dibasic carboxylic acid which comprises reacting said reaction product with a water-soluble polyacid selected from the group consisting of phosphotungstic acid, phosphomolybdic acid, silico-tungstic acid and polyphosphoric acid of opposite electrochemical charge and which will react therewith to form a hydrophobic precipitate.

4. The process of claim 3 in which the said reaction product is a mixed polymer.

5. The process of claim 3 in which the said reaction product is drawn during the reaction thereof with said polyacid.

6. The process of improving the water-resistance of a water-sensitive reaction product of a linear polymer-forming composition composed in substantial amount of reacting materials selected from at least one of the group consisting of (1) monoaminomonocarboxylic acids and (2) mixtures of diamine with dibasic carboxylic acid which comprises reacting said reaction product, in the presence of a swelling agent for the latter, with a water-soluble polyacid selected from the group consisting of phosphotungstic acid, phosphomolybdic acid, silico-tungstic acid and polyphosphoric acid of opposite electrochemical charge and which will react with said reaction product to form a hydrophobic precipitate.

PAUL SCHLACK.